United States Patent
Qiang et al.

(10) Patent No.: US 6,288,396 B1
(45) Date of Patent: Sep. 11, 2001

(54) SATELLITE THERMAL INFRARED TECHNIQUE FOR SHORT-TERM AND IMPENDING PREDICTION OF STRONG EARTHQUAKES

(76) Inventors: Zuji Qiang; Jun Qiang, both of No. 1001, Building 13, Fuxing menwai Street, Beijing 100045 (CN)

( * ) Notice: Subject to any disclaimer, the term of this patent is extended or adjusted under 35 U.S.C. 154(b) by 0 days.

(21) Appl. No.: 09/305,664

(22) Filed: May 5, 1999

(30) Foreign Application Priority Data

Mar. 5, 1999 (CN) .................................................. 99 102754

(51) Int. Cl.⁷ ....................................................... G01W 1/00
(52) U.S. Cl. ...................................................... 250/339.14
(58) Field of Search ......................................... 250/339.14

(56) References Cited

U.S. PATENT DOCUMENTS 4,656,867 * 4/1987 Sasaki ................................ 73/170 R

* cited by examiner

Primary Examiner—Constantine Hannaher
Assistant Examiner—Otilia Gabor
(74) Attorney, Agent, or Firm—Dougherty & Troxell

(57) ABSTRACT

A satellite thermal infrared technique for short-term and impending prediction of strong earthquakes, by use of polar orbit satellites, geosynchronous satellite and meteorological satellites, combined with other satellites carrying scanners with infrared waveband, satellite receiving equipment and image processing equipment, in which the color density in a meteorological satellite thermal infrared map are divided into grades, which are adaptable to different seasons and latitudes. The brightness temperature data collected from infrared scanners are used to obtain the absolute temperature through atmospheric model corrections. The phenomena of temperature decreasing ring may appear over the cloud layers within the earthquake-pregnant region. Odd shaped clouds may appear in the sky over the earthquake-pregnant before quaking. When the earthquake occurs on a plateau region in the inland, certain thermal stress lines can be observed, the converging points of these thermal stress lines indicating the future epicenter.

5 Claims, No Drawings

SATELLITE THERMAL INFRARED TECHNIQUE FOR SHORT-TERM AND IMPENDING PREDICTION OF STRONG EARTHQUAKES

FIELD OF THE INVENTION

The invention relates to a satellite thermal infrared technique for short-term and impending prediction of strong earthquakes, i.e., using satellite thermal infrared temperature anomalies as short-term and impending prediction of earthquake, specifically, to a method for short-term and impending prediction of three elements (the time, location and magnitude "Ms") of an earthquake which is from middle to strong earthquake. The present invention belongs to the field of remote sensing and seismology.

BACKGROUND OF THE INVENTION

Earthquake prediction, especially short-term and impending prediction, is a major unresolved problem faced by the contemporary world. The study of earthquake prediction has been conducted for several decades at home and abroad, yet little progress has been made. There are four gaseous rings around the earth, plus the atmosphere ring outside the earth, make altogether five gaseous rings around the earth, which are interactive. Before the occurrence of an earthquake, the rock stratums around a large area are under pressure, fissure occurs, thus releasing large amount of gases, such as $CH_4$, $CO_2$, $CO$, $H_2$, $H+$, $He$ and $H_2O$ from deep within the globe. The result is the temperature increase in low-atmosphere areas or the temperature decrease at the cloud layer. Experiments have been conducted by the inventor since October 1989 and successful predictions were made upon analysis of hundreds of earthquakes. A whole new way of earthquake prediction is thereby created based on data obtained from the American NOM with infrared waveband scanners, the geo-synchronous satellite GMS of Japan and the wind-cloud No. 1 and No. 2 satellite of China, wherein the orbit of the polar satellite covers an area of 2,800 km in width and several thousands kilometers in length and that of a meteorological map of the geosynchronous satellite is 6,000×10,000 sq.km. Such a scanning map via satellite can be obtained in one hour. Both types of satellites are capable of collecting brightness temperature data. NOM has brightness temperature resolution as high as 0.5° C. and GMS has higher temporal resolution.

SUMMARY OF THE INVENTION

A quantitative analysis of the measured brightness of temperature anomalies and the comparison with the absolute temperature at the same time can determine the dynamic evolution of the surface temperature of the globe and above the water. Since the thermal infrared data provided by the satellite has advantages in accurate reliability, large covering area, rapid collection and transmission of large quantity of information, the success rate of earthquake prediction based on this technique has been greatly improved. The invention has applied the satellite thermal infrared remote sensing technique to the earth observation, coupled with the use of GIS (geographic information system) and computer techniques. A large amount of information regarding abrupt abnormal temperature increases and decreases on the surface of the earth caused by the coupling of the solid earth and the atmosphere can be obtained. The phenomena are different from the usual temperature increase anomalies, and are regarded as earthquake precursors. There is close causation between the abnormal thermal infrared temperature decreases and the upcoming earthquake. At this time, meteorological earthquake precursors can be observed over an active fault, such as the cloudless thermal channel appearing between the stress linear clouds and cloud lines and the temperature decreasing odd shaped cloud over the cloud layers. Because of continuous and deep research, new contents of this technique require supplements. In the last two years because earthquakes have occurred more frequently, we are able to collect rich data in the course of the earthquake prediction research, which are summarized therefrom into such new technique for earthquake prediction utilizing satellite thermal infrared anomalies. The statistics show that the percentage of successful predictions has been greatly improved to more than 50% by use of this method. However, there are still several defects in regard of defining the three elements for the earthquake, such as the position range of the epicenter should be further decreased; the quaking time should be divided into two types, i.e., short-term and impending; the interfering factors effecting the prediction should be further probed and removed.

The creative points of the present invention patent application have enabled us to achieve great progress on earthquake predictions since 1998. There are as below.

Besides the abnormal temperature increase before the earthquake, other special earthquake precursors may occur utilizing the thermal infrared technique for earthquake predictions:

1. The phenomena that a temperature decrease ring may appear over the cloud layers within the earthquake-pregnant region. The phenomena appear in regional characteristics before the quaking. For example, before the quaking was occurred to Ms. 6.2 Zhangbei-Shangyi (China on the east) on Jan. 10, 1998, an obvious temperature decrease ring appeared above the quake area.
2. Odd shaped clouds may appear in the sky over the earthquake-pregnant region before quaking.
3. When the earthquake occurs on a plateau region in the inland, because of the varied, waved and complicated topography, it is difficult to observe and distinguish the anomaly phenomena of earthquake precursors. The temperature increase anomalies may appear at some low-lying river valley region. By connecting these temperature increase regions, certain thermal stress lines can be appeared, then the converging points of these thermal stress lines will be the future epicenter. For example, there appeared the thermal stress lines in earthquake-pregnant region before the Ms. 7.5 Mani earthquake in Nagquu, Tibet on Dec. 8, 1997.

The object of the invention is:

to further improve the above-mentioned short-term and impending earthquake prediction method based on satellite thermal infrared temperature anomalies, in order to improve the percentage of successful predictions, especially to decrease the range of the epicenter;

to precisely divide the predicting quaking time into two types, i.e., the short-term prediction and impending prediction; and to further remove the interfering factors effecting on prediction.

The invention can be applied in all over the world, so as to reduce the disaster caused by the earthquake to the maximum degree.

DETAILED DESCRIPTION OF THE PREFERRED EMBODIMENT

The color density in a meteorological satellite thermal infrared map are divided into grades, which are adaptable to different seasons and latitudes, the satellite thermal infrared temperature increase and decrease anomalies as earthquake precursors can be obtained easily. The grade of color density is equal to the grade of brightness temperature which can be 0.5° K to 5° K, for example, for regions located to the north of N40°, the grade of brightness temperature used is 1° K, for regions between N10° to N35° the grade of brightness temperature is 2° to 3° K, and the grade of brightness temperature in equator area (such as Indonesia) and the polar region (such as New Zealand and Ice-Island) are 0.5° K and 5° K respectively. Different can be applied in summer and winter. The brightness temperature data collected from infrared scanners are used to obtain the absolute temperature through atmospheric model corrections, that is as conversion, plus or minus 1° K to the observed results, according to the actual regional conditions. Based on the analysis of shapes of air mass and the morphology of lands, the interference data relating to the morphological and meteorological factors can be removed and the temperature increase and decrease caused by an upcoming earthquake is distinguished from those in the meteorological process. For example, whether the thermal anomaly shape observed from 12:00 to 18:00 (universal time) is across different geomorphological units, if it is, it is then an earthquake precursor. Otherwise, it is caused by meteorological effects.

There were 99 times for the predicting earthquakes with magnitude greater than Ms. 5.0 from October 1989 to the end of 1998, in which the method provided by the present invention, was successful 62 times, i.e., the predicted time, epicenter and magnitude of these earthquakes were relatively accurate. The relationship between the three elements of earthquake for short-term and impending prediction and the characteristics of thermal infrared temperature anomalies as earthquake precursors and its evolutional rules are summarized as following:

(1) time: the precursors of over Ms. 5.0 earthquake may appear 10 to 20 days prior to the occurrence of the earthquake with a temperature anomaly area of 100,000 to 600,000 sq.km. In areas where the lithosphere is very thick, the thermal anomaly may appear 30 to 120 days before the occurrence of the earthquake. When it is covered by cloud layers, the temperature decrease odd shaped cloud may appear over the cloud layers, which may also be regarded as short-term and impending earthquake precursors.

(2) location (epicenter): the predicted epicenter of an upcoming earthquake can be grouped into three types. In the first type, the thermal anomaly appears in both the future epicenter and its surrounding area. The temperature increase anomaly in the surrounding area enlarges clearly and continuously, then moves toward the future epicenter and finally the two thermal anomalies are connected. The edge of the temperature anomaly in the forward direction is the future epicenter. In the second type, the temperature increase anomaly appears only in the area surrounding the future epicenter and extends towards the future epicenter with time. The converging points of the temperature increase region in the forward direction and the tectonic zone or an intensive seismic zone are the future epicenter. In the third type, when the earthquakes occur at the plateau area in the inland, the temperature increase anomaly may appear at the low-lying valley zones, by connecting these temperature increase region, certain thermal stress lines can be appeared, the converging points of these thermal lines will be the epicenter of the future earthquake.

(3) magnitude: temperature increase with an area of over 100,000 square kilometers indicates an earthquake of about Ms. 5.0. One with an area of more than 400,000 square kilometers refers to an earthquake of about Ms. 6.0 And that of over 600,000 or 1,000,000 square kilometers indicates an earthquake greater than Ms. 7.0.

Some examples of successful short-term and impending predictions made using the method provided by the present invention are as below.

On Apr. 16, 1992 (4 days prior to the predicted earthquake) a NE-direction temperature increase anomaly appeared in the Okinawa trough northeast to Taiwan Island. By April 17 (3 days prior to the earthquake), the temperature anomaly extended towards southwest and south and was over the Hualian area where there was a strong seismic zone to the east of Taiwan Island. The short-term and impending prediction for the three elements of the upcoming earthquake was made on the same day and three days later (April 20) a Ms. 6.8 earthquake occurred in the predicted area.

On Nov. 22, 1995, a Ms. 7.5 earthquake occurred in Yacarbana Gulf, Jordan. 10 days prior to the quake, an isolated temperature increase anomaly appeared in the Yacarbana Gulf and the neighboring land to the north of the Gulf. There was a satellite thermal infrared temperature increase anomaly before an earthquake.

On Dec. 16, 1996, after an Ms. 4.0 earthquake occurred in Gaoliying, Beijing, a few days later, on December 20 and 21, an EW-direction temperature increase anomaly appeared in the area between Changli, Hebei province and Yanqing, Beijing. Since the area of anomaly is only tens of thousands square kilometers, we made a denial of the possibility that an earthquake greater than Ms. 5.0 might occur in the subsequent days. This prediction made a contribution to stabilization of society and popular sentiments. Similarly, a hearsay about intensive seism appeared in the spring festival of 1998 in Beijing, a negative answer was made by utilizing the satellite thermal infrared technique.

On Aug. 27, 1998, a Ms. 6.6 earthquake took place in Jiashi, Xinjiang, 15 days prior to the quake (August 13), an isolated temperature increase anomaly appeared in the west of Talimu. On August 1, two groups (NE, EW direction) of thermal stress lines converged near Jiashi, and the prediction for the three elements of the earthquake was made on August 14. The result was on August 27, 1998, a Ms. 6.6 earthquake occurred in Jiashi, Xinjiang (N39.9°, E77.9°). This was the most intensive earthquake occurring in China in 1998. The three elements of this prediction are all accurate.

What is claimed is:

1. A method of short term and impending earthquake prediction comprising the steps of:

a) observing by use of orbiting satellites a color density of a meteorological satellite thermal infrared map of a pre-selected area, the color density being equal to a brightness temperature ranging between 0.5° K and 5° K;

b) correcting the brightness temperature according to the latitude and the season of the pre-selected area;

c) obtaining absolute temperature of the pre-selected area by eliminating morphological and meteorological factors from the graded brightness temperature;

d) comparing the observed absolute temperature to historical temperature data of the pre-selected area to determine a temperature anomaly and an area over which the temperature anomaly occurs;

e) predicting the time of an impending earthquake of at least Ms. 5.0 to be between 10 and 120 days based upon the temperature anomaly area of between 100,000 and at least 600,000 square kilometers f) predicting the locations of an epicenter of the impending earthquake based on a location of a forward edge of the area of the temperature anomaly; and, g) predicting the magnitude of the impending earthquake based upon the area of the temperature anomaly.

2. The method according to claim 1 wherein the magnitude of the impending earthquake is Ms. 5.0 if the area of the temperature anomaly is at least 100,000 square kilometers; Ms. 6.0 if the area of the temperature anomaly is at least 400,000 square kilometers; and an Ms. of at least 7.0 if the area of the temperature anomaly is at least 600,000 square kilometers.

3. The method according to claim 1 wherein the correction of the brightness temperature is 1° K for areas located north of N40° latitude, at least 2° K for areas between N10° and N35° latitude, 0.5° K for areas adjacent to the equator, and 5° K for polar regions.

4. The method according to claim 1 wherein the temperature anomaly comprises a temperature increase in a surface of the pre-selected area.

5. The method according to claim 1 wherein the temperature anomaly comprises a temperature decrease of a cloud layer above the pre-selected area.

* * * * *